Nov. 7, 1961 TAKEO OGATA ET AL 3,007,388
SUPER HIGH SPEED CAMERA
Filed July 10, 1958
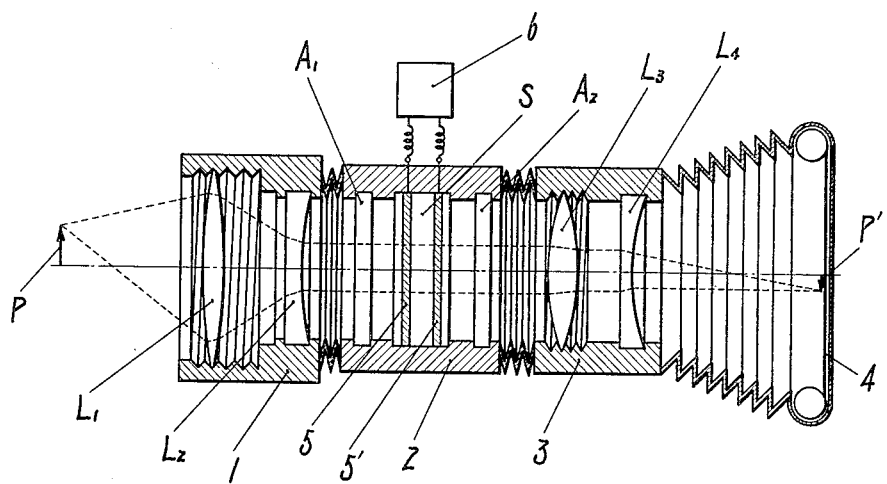
INVENTORS
TAKEO OGATA
YOHEI WACHI
BY   MAURO & LEWIS
         ATTORNEYS

# United States Patent Office 3,007,388
Patented Nov. 7, 1961

3,007,388
SUPER HIGH SPEED CAMERA
Takeo Ogata, Kawasaki City, Kanagawa, and Yohei Wachi, Tokyo, Japan, assignors to Oki Electric Industry Company, Ltd., Tokyo, Japan, a corporation of Japan
Filed July 10, 1958, Ser. No. 747,752
Claims priority, application Japan July 11, 1957
2 Claims. (Cl. 95—53)

The present invention relates to a super high speed camera, and particularly to an improved electro-optical shutter for such a camera.

This invention provides means which permits super high speed photography by controlling the cross-section and aperture angle of the light flux, entering a crystal plate shutter, within prescribed values in order to make the amount of incident light as large as possible in electro-optical apparatus using a uniaxial single transparent crystal as the photographing shutter, while providing for the smallest amount of light leakage after the closing of the shutter. The parallel plate, cut along a proper direction, of a uniaxial single transparent crystal such as ammonium dihydrogen phosphate, potassium dihydrogen phosphate, or barium titanate presents a marked Kerr effect, and so the transmitting light can be controlled (as is well known) by combining the parallel plate of such crystal together with polarizer and analyzer and impressing an electromotive force across the parallel faces of the plate; the restoring period after the removal of the impressed voltage is extremely short, being $10^{-9}$ sec. or less, so that it is a well-known fact that the combination mentioned above can be applied to a super high speed photographing shutter. However, this kind of shutter has always had the disadvantage of letting some of the light which is oblique to the optical axis of the crystal plate pass through to some extent, when the shutter is "closed," and the light thus transmitted becomes the undesirable leakage light after closing of the shutter.

If the kind of crystal plate used, or the refractive index of which and its thickness are determined, this leakage light is influenced solely by the angle made by the oblique light and the optical axis. Up to this time no appropriate method of obstructing such leakage light has been worked out, so that practical utilization of this sort of shutter has not been developed.

If an iris diaphragm is situated just in front of the crystal plate shutter, and if the aperture of the diaphragm is made small for the purpose of diminishing the amount of leakage light, the angle subtended by the incident rays on the crystal plate becomes smaller and so the leakage light is reduced, but, if it is intended to increase the photographing speed, the exposing period is inevitably shortened and thus more incident light is needed in order to maintain the sensitivity. Such a counteracting character makes high speed photography impossible with this proposal.

The object of the present invention is to minimize the amount of leakage light in the closed condition of a uniaxial single transparent crystal plate shutter, and to enable the photographing of a momentary phenomenon lasting less than 1 μsec. by letting in a large amount of light; specifically by employing a collimating lens on the object side placed in front of the shutter, and at the same time limiting the aperture angle of the light entering the crystal plate shutter within a prescribed value.

The single illustration is a sectional elevation showing one embodiment of a super high speed camera according to the present invention.

Referring to the figure, it is seen that the rays of light radiating from the object P pass through the collimating section on the object side and the image P' is formed on the sensitive film 4 at the image-forming section 3, via the light controlling or shutter section 2. These parts are installed in a dark box, and thus the device acts as a camera to obstruct the leakage of light from lateral sides. The first lens $L_1$ at the object side of the collimating section 1 is the convex lens which receives the rays of light radiating from object P; and within the image-forming distance of the lens, and yet at a position where the light flux leaving the lens has been properly converged, the concave lens $L_2$ or the second lens on the object side is situated. At the collimating section 1 on the object side the cross-section and the aperture angle of the light flux entering the crystal plate shutter S is adjusted to be limited within prescribed values, and in order to increase the imaging light in the diameter of the first lens $L_1$ on the object side is made as large as possible and the aperture angle of light flux is limited within a prescribed value by forming a long focus with the aid of the second (diverging) lens $L_2$ on the object side.

Moreover, this result can also be achieved by using a single long focus lens instead of such a lens combination as above; however, in the former case it can not be avoided that the cylinder accommodating the lens system becomes extremely long.

The light flux leaving the collimating section 1 on the object side passes through the polarizer $A_1$ in the shutter section 2, crystal plate shutter S, and analyzer $A_2$, successively, and if the plane of polarization of polarizer $A_1$ is placed to cross that of analyzer $A_2$, rays of light are obstructed in the absence of an impressed electromotive force. Crystal plate S is a parallel plate consisting of a uniaxial single crystal, and both its faces are coated with conductive electrodes 5 and 5' of electroconductive transparent glass, or light transparent metal foils, or mesh-type metal foils, and, if a momentary electromotive force is impressed across 5 and 5' by means of a proper pulse voltage generator 6, the crystal plate that has been a uniaxial single crystal become a biaxial crystal and accomplishes the shuttering action by transmitting an amount of light in proportion to the magnitude and duration of the impressed voltage.

The image position for the rays of light that have passed through the collimating section 2 would be situated at a very great distance if they are left to proceed, and so a very long cylinder would be required. Consequently, in order to produce the final image with a prescribed size and at a prescribed position, the image of object P is formed on the image-forming plate 4 by means of the lens system consisting of the image-forming lens $L_3$ and the image-forming lens $L_4$, each chosen properly, and disposed in the collimating section 3.

What we claim is:

1. In a high speed camera, an electro-optical shutter of the Kerr cell type utilizing a flat electrically responsive birefringent single crystal oriented with its plane substantially perpendicular to the optical axis of the shutter and provided with light-transmitting electrodes adjacent its opposite flat faces to control the transmission of polarized light therethrough, and a pair of crossed polarizing elements disposed respectively on opposite sides of said crystal-and-electrode unit, the improvement which comprises in combination with the foregoing, an essentially telescopic light-collimating lens system disposed at the object side of the shutter comprising a relatively large-aperture positive front lens and a negative rear lens spaced therefrom and within the principal focus of said front lens, whereby the convergence angle of rays passing through said crystal is limited to a predetermined value sufficiently small to prevent light leakage when the shutter is in "closed" condition.

2. The combination of claim 1, and a second essentially telescopic image-forming lens system disposed at the image side of the shutter.

References Cited in the file of this patent

UNITED STATES PATENTS

| | | |
|---|---|---|
| 2,072,419 | Birch-Field | Mar. 2, 1937 |
| 2,616,962 | Joffe | Nov. 4, 1952 |
| 2,705,903 | Marshall | Apr. 12, 1955 |